US011363056B2

(12) United States Patent
Maxwell et al.

(10) Patent No.: US 11,363,056 B2
(45) Date of Patent: *Jun. 14, 2022

(54) COMPROMISED PASSWORD DETECTION BASED ON ABUSE AND ATTEMPTED ABUSE

(71) Applicant: VERIZON PATENT AND LICENSING INC., Basking Ridge, NJ (US)

(72) Inventors: Lachlan A. Maxwell, Ashburn, VA (US); Donald J. McQueen, Leesburg, VA (US); William C. Wakefield, III, McLean, VA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/734,630

(22) Filed: Jan. 6, 2020

(65) Prior Publication Data

US 2020/0145452 A1 May 7, 2020

Related U.S. Application Data

(63) Continuation of application No. 16/392,367, filed on Apr. 23, 2019, now Pat. No. 10,530,807, which is a
(Continued)

(51) Int. Cl.
*G06F 12/14* (2006.01)
*H04L 9/40* (2022.01)
*G06F 21/46* (2013.01)

(52) U.S. Cl.
CPC .......... *H04L 63/1441* (2013.01); *G06F 21/46* (2013.01); *H04L 63/083* (2013.01); *H04L 63/107* (2013.01); *H04L 63/1425* (2013.01)

(58) Field of Classification Search
CPC . H04L 63/1441; H04L 63/083; H04L 63/107; H04L 9/3236; H04L 2463/121;
(Continued)

(56) References Cited

U.S. PATENT DOCUMENTS 7,523,499 B2 * 4/2009 Wilkins ................ H04L 63/083
713/183
8,146,143 B1 * 3/2012 Emigh ................ H04L 67/1068
726/6

(Continued)

OTHER PUBLICATIONS

Jo et al, Mindmetrics: Identifying Users without their Login IDs, IEEE, Oct. 8, 2014, pp. 2121-2126. (Year: 2014).*
(Continued)

*Primary Examiner* — Luu T Pham
*Assistant Examiner* — Jenise E Jackson

(57) ABSTRACT

Systems and methods are disclosed for analyzing a plurality of failed login records that correspond to failed login attempts detected by a computing system, to identify suspicious patterns of activity that can facilitate the supplementation of password blacklists for improving account security. To accomplish the foregoing, failed login records that include information associated with failed login attempts are obtained for analysis. The failed login records are analyzed to identify a set of failed login records that show initial characteristics of a suspicious pattern of activity. The information included in the set of failed login records are further analyzed to determine whether a suspicious pattern of activity is actually present. When a suspicious pattern of activity is identified in the set of failed login records, the passwords used in the failed login attempts are stored in password blacklists associated with the account identifier(s) with which the passwords were used.

20 Claims, 5 Drawing Sheets

Related U.S. Application Data continuation of application No. 15/005,319, filed on Jan. 25, 2016, now Pat. No. 10,270,801.

(58) Field of Classification Search
CPC ... H04L 9/0872; H04L 63/101; H04L 63/102; H04L 63/104; H04L 63/1425; G06F 2221/2131; G06F 21/316; G06F 21/31; G06F 21/45; G06F 21/46; G06F 2221/2111; G06F 2221/2151; H04W 12/06
USPC .......................................................... 726/23
See application file for complete search history.

(56) References Cited

U.S. PATENT DOCUMENTS

| | | | | |
|---|---|---|---|---|
| 8,862,551 | B2* | 10/2014 | Lim | H04L 63/104 707/648 |
| 8,904,506 | B1* | 12/2014 | Canavor | G06F 16/00 726/7 |
| 9,148,424 | B1* | 9/2015 | Yang | H04L 63/20 |
| 9,275,226 | B1* | 3/2016 | Roundy | G06F 21/56 |
| 10,673,862 | B1* | 6/2020 | Threlkeld | H04L 63/08 |
| 2005/0188423 | A1* | 8/2005 | Motsinger | H04L 67/22 726/22 |
| 2010/0185870 | A1* | 7/2010 | Rane | H04L 9/3247 713/184 |
| 2011/0141276 | A1* | 6/2011 | Borghei | H04W 12/12 348/143 |
| 2011/0225648 | A1* | 9/2011 | Channakeshava | G06F 21/46 726/18 |
| 2012/0002808 | A1* | 1/2012 | Wang | G07C 9/37 380/44 |
| 2014/0181968 | A1* | 6/2014 | Ge | H04L 63/1425 726/23 |
| 2014/0373136 | A1* | 12/2014 | Igelka | H04L 63/1441 726/22 |
| 2015/0128233 | A1* | 5/2015 | Nechytaylo | H04W 12/06 726/6 |
| 2015/0227542 | A1* | 8/2015 | Thatavarthy | G06F 16/215 707/692 |
| 2015/0288715 | A1* | 10/2015 | Hotchkiss | H04L 63/0876 726/7 |
| 2016/0173485 | A1* | 6/2016 | Popoveniuc | H04L 63/1433 726/1 |
| 2016/0197907 | A1* | 7/2016 | Bajenov | G06F 21/55 726/7 |

OTHER PUBLICATIONS

Tatli et al, Cracking More Password Hashes with Patterns, IEEE, Apr. 13, 2015, pp. 1656-1665. (Year: 2015).*

* cited by examiner

COMPROMISED PASSWORD DETECTION BASED ON ABUSE AND ATTEMPTED ABUSE

CROSS REFERENCE TO RELATED APPLICATIONS

This application claims priority to and is a continuation of U.S. application Ser. No. 16/392,367, filed on Apr. 23, 2019, entitled "COMPROMISED PASSWORD DETECTION BASED ON ABUSE AND ATTEMPTED ABUSE", which claims priority to and is a continuation of U.S. application Ser. No. 15/005,319, filed on Jan. 25, 2016, entitled "COMPROMISED PASSWORD DETECTION BASED ON ABUSE AND ATTEMPTED ABUSE". U.S. application Ser. No. 16/392,367 and U.S. application Ser. No. 15/005,319 are incorporated by reference herein in their entirety.

BACKGROUND

Data breach of computing systems is a growing dilemma, one that can expose a wide range of personally identifiable information and/or account credentials. Hackers are becoming increasingly proficient at leveraging stolen account credentials on other systems where users may have adopted the same account credentials. Stolen account credentials can be valid on other systems, particularly in instances where users adopt the same email address and password combination across systems. Hackers will make numerous requests to login to various systems using the stolen account credentials in an attempt to determine if any of the stolen account credentials are valid on these systems. When account credentials are not valid on other systems, hackers patiently hold onto the stolen information, waiting for the possibility that users re-adopt the same account credentials stolen from the initial data breach. In this regard, if owners of the stolen identities set or reset their passwords on these systems to match the stolen passwords, they will unknowingly open their accounts to unlawful access by the hackers.

Computing systems regularly employ password blacklists designed to prevent users from adopting certain passwords in association with their accounts. While traditional methods for blacklisting passwords are generally limited to the user's password history, a system or method that can automatically supplement password blacklists with passwords associated with detected suspicious activities would be highly beneficial.

SUMMARY

Embodiments described herein are directed to improving account security based on identified suspicious patterns of activity. More specifically, records corresponding to a number of failed login attempts are obtained. The records include, among other things, the password, or a variation thereof, used in each failed login attempt. The records also include failed login data that references a location and/or a timestamp associated with each failed login attempt. A suspicious pattern of activity that corresponds to a group of the records is identified. In one embodiment, the suspicious pattern is identified when, among other things, every record in the group of records reveals that the same password was utilized in every failed login attempt. In another embodiment, the suspicious pattern is identified when, among other things, every record in the group reveals that the same piece of failed login data was associated with every failed login attempt. After identifying the suspicious pattern of activity, the password(s) from the group of records that correspond to the suspicious pattern of activity are stored into a password blacklist.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The present invention is described in detail below with reference to the attached drawing figures, wherein.

DETAILED DESCRIPTION

Figure 1:
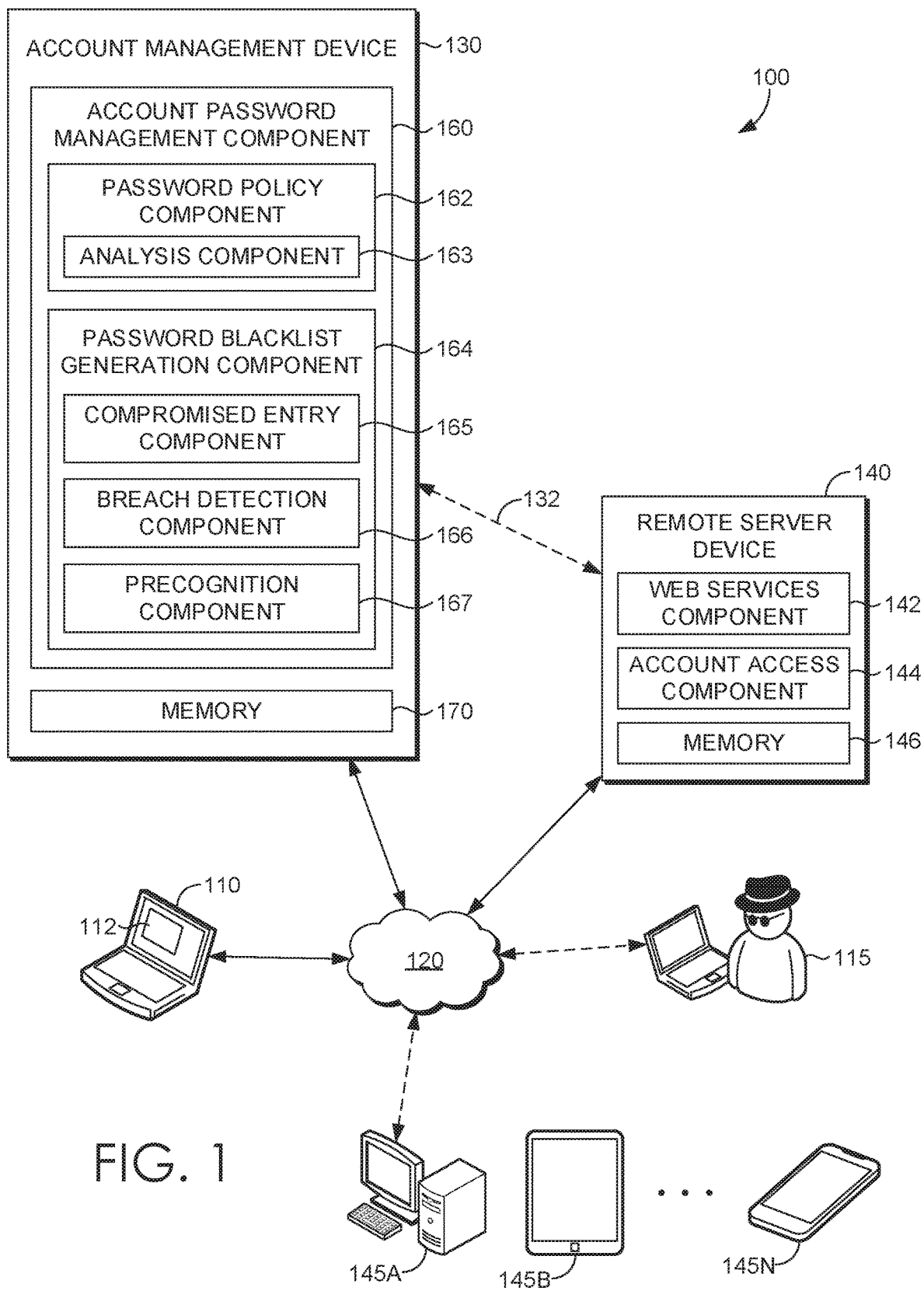
FIG. 1 is a diagram illustrating an exemplary system environment, in accordance with some implementations of the present disclosure.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Passwords are generally known to be the weakest link in computing systems that employ an account-based access framework. One of the most effective methods for reducing the risk of account compromise is the employment of a policy-based password reset. Policy-based password resets can define, among other things, time-based rules that prevent users from utilizing a particular password beyond a predefined period of time, history-based rules that prevent users from adopting certain passwords (e.g., previously-adopted by the user within a particular window of time and/or within a particular number of previously-adopted passwords), and complexity-based rules that set minimum standards for password complexity (e.g., minimum length, varying letter case, number and/or symbol inclusion, minimum variation from previously-adopted passwords). Employment of the policy-based password reset has been effective in reducing rates of account compromise.

History-based rules, in particular, employ what are generally known as password history logs (hereinafter referred to as "blacklists,") which can store one or more "bad" passwords that cannot or should not be associated with any one or more usernames, aliases, or email addresses (hereinafter referred to as "account identifiers"). These password blacklists are typically supplemented with a new "bad" password as a result of any particular password failing the conditions of a time-based rule (e.g., an expired password). Other "bad" passwords can be added to password blacklists by way of various security schemas, such as known instances of compromise or identified instances of account breach. In one example, if a system administrator is informed that one or more user passwords were definitely compromised (e.g., via a known-to-be-stolen account identifier/password "list"), the system administrator can simply update the password blacklists of the affected user(s) using the information from the known-to-be-stolen list. In another example, various security measures may be employed to determine whether account credentials have been exposed by way of a detected breach. For instance, and by way of example only, a detection of large quantities of spam e-mail sent through one or more user accounts can indicate instances of exposed account identifier(s) and password(s). In this regard, the system administrator or other automated security measure may update the password blacklists associated with the user(s) affected because of the detected breach.

Sometimes, user account information that is unlawfully obtained because of a system breach is leveraged on other "non-breached" systems. Because statistics show that a large percentage of users tend to adopt the same account credentials across multiple domains, malicious hackers have been known to perform repeated login attempts utilizing the stolen account identifier/password combinations that were obtained from the breach. Oftentimes, hackers are successful in accessing these accounts because of matching account credentials across these domains. Moreover, even in instances where users do not adopt the same passwords across these domains, if/when users reset their passwords, there is a high likelihood that they adopt the exact same password on the "list" in the hacker's possession. As a result, users may unknowingly open up their accounts to hackers as a result of changing their password.

If the user account information obtained because of a breach was availed to system administrators of these other "non-breached" systems, the stolen passwords could easily be added to appropriate password blacklists, preventing the related users from ever adopting the passwords on such systems. In this way, the hackers would be unsuccessful in their attempts to access the system at any given time. Unfortunately, system administrators generally do not have access to these lists.

To their benefit, however, system administrators do have an ability to gather data associated with the failed login attempts made on their own systems. As such, embodiments described herein are directed to improving account security based on identified suspicious patterns of activity in a computing system. In other words, embodiments described herein identify suspicious patterns of activity using the data gathered from failed login attempts to the computing system. The password data used in the failed login attempts can be extracted and added to appropriate password blacklists. In this way, a security schema based on identified suspicious patterns of activity can be employed to blacklist certain passwords from association with users.

One reason for blacklisting passwords using identified suspicious patterns of activity is based on a "precognition" that the passwords will be used in future malicious login attempts. While the term "precognition" is used herein to reference a reason why certain passwords are added to password blacklists, the term is not to be taken literally in the sense that passwords are paranormally known to be used by hackers in a malicious manner. On the contrary, the term is used to describe a logical and determined likelihood that certain passwords are in the possession of a supposed hacker, based on suspicious patterns of activity that are identified in accordance with a number of failed login attempts by the supposed hacker.

Turning now to FIG. 1, a diagram is provided illustrating an exemplary system environment in accordance with implementations of the present disclosure. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

The system 100 can be a server-only or a client-server system that can be utilized to improve account security. Among other components not shown, the system 100 can include any number of client devices, such as administrator client device 110, network 120, one or more account management devices 130, and/or one or more remote server devices 140. It should be understood that any number of servers and client devices may be employed within system 100 within the scope of the present disclosure. Each may comprise a single device or multiple devices cooperating in a distributed environment. Additionally, other components not shown may also be included within the distributed environment.

It should further be understood that system 100 shown in FIG. 1 is an example of one suitable computing system architecture. Each of the servers and client devices shown in FIG. 1 may be implemented via a computing device, such as computing device 500, later described with reference to FIG. 5, for example. The components may communicate with each other via network 120.

Network 120 may be wired, wireless, or both. Network 120 may include multiple networks, or a network of networks, but is shown in simple form so as not to obscure aspects of the present disclosure. By way of example, network 120 can include one or more wide area networks (WANs), one or more local area networks (LANs), one or more public networks, such as the Internet, and/or one or more private networks. Where network 120 includes a wireless telecommunications network, components such as a base station, a communications tower, or even access points (as well as other components) may provide wireless connectivity. Networking environments are commonplace in offices, enterprise-wide computer networks, intranets, and the Internet. Accordingly, network 120 is not described in significant detail.

By way of background, asset users on client devices 145*a*, 145*b*, . . . 145*n* can make one or more requests or "attempts" to access web services provided by the one or more remote server devices 140 over network 120. As will be referenced herein, asset users are the authorized owners of the various account identifiers used for accessing web services provided by the one or more remote server devices 140. When submitted with a request, the asset user's account identifier, paired with the right password, can grant the asset user with access to the web services. In various instances, depending on whether authentic account credentials are submitted with a particular request, a client device may or may not be given authorized access to the web services provided by the one or more remote server devices 140.

In some instances, a malicious user, such as malicious user on hacker device 115, can make one or more attempts to access web services provided by the one or more remote server devices 140 over network 120. As will be referenced herein, a hacker is generally not an authorized owner of an account identifier used for accessing web services provided by the one or more remote server devices 140. The hacker is known to make repeated failed login attempts to access the web services over network 120 using one or more account identifier/password combinations. Generally, the hacker makes these repeated failed login attempts using account identifier/password combinations provided on a "list," with hopes that one of the combinations on the list will provide the hacker with access to the web services. The list, as was described, can include account credentials that were unlawfully obtained, for instance, by way of a system breach of another system.

In accordance with embodiments of the present disclosure, each of the client devices 145a, 145b, . . . 145n and hacker device 115 can be a computing device that is capable of accessing the Internet, such as the World Wide Web. Client devices 145a, 145b, . . . 145n and hacker device 115 might take on a variety of forms, such as a personal computer (PC), a laptop computer, a mobile phone, a tablet computer, a wearable computer, a personal digital assistant (PDA), an MP3 player, a global positioning system (GPS) device, a video player, a digital video recorder (DVR), a cable box, a set-top box, a handheld communications device, a smart phone, a smart watch, a workstation, any combination of these delineated devices, or any other suitable device.

Client devices 145a, 145b, . . . 145n and hacker device 115 can attempt to access the web services, provided by the one or more remote server devices 140, by sending requests to the one or more remote server devices 140 over the network 120. Such requests can be sent using any HTTP-compatible application (e.g. an application that supports an HTTP or HTTPS protocol), such as a browser. In each attempt to access the web services, the devices send, with each request, user-provided account credentials (e.g., an account identifier and associated password) to the remote server device 140, or components thereof, for cross-checking and verification with authentic account credentials. The authentic account credentials can be stored in a memory on the remote server device 140, in a memory on an account management device 130 in communication with the remote server device 140, or any combination thereof, as will be described. Generally speaking, if the account credentials provided by users on devices 115, 145a, 145b, . . . 145n, match the authentic account credentials, the users are provided with access to assets of the web services by way of their devices 115, 145a, 145b, . . . 145n.

A "login attempt," as will be referenced herein, refers to a request to access the web services that is received by the one or more remote server devices 140. The login attempt can include the account credentials and/or login data associated with the request. The login data is, essentially, metadata that may include, for instance, timestamps associated with the request received by the one or more remote server devices 140, a network address (e.g., IP address) associated with the sending device of the received request, or other form of identifying data associated with the received request or sending device thereof.

While the illustration in FIG. 1 portrays account management device 130 and remote server device 140 as two separate entities having individual roles (e.g., account management and web services, respectively), being in communication with one another and working cooperatively to provide secured access to web services, it is contemplated that the account management device 130 and the one or more remote server devices 140 can be a single entity comprising one or more computing devices. For instance, components and operations associated with account management device 130 can be incorporated into the one or more remote server devices 140, and vice versa.

In accordance with embodiments described herein, remote server device 140 can include one or more server computing device(s) configured in a network environment, or can include a single computing device having, in some embodiments, a web services component 142 and an account access component 144. The web services component 142 can be any web service or application service configured to provide asset users (for instance, users on client devices 145a, 145b, . . . 145n) access to an asset (e.g., a website or a web application), on the condition that the asset users provide authorized account credentials (i.e., account credentials matching the authentic account credentials) to account access component 144, as will be described.

Each remote server computing device 140 can include one or more processors, and one or more computer-readable media. The computer-readable media may include computer-readable instructions executable by the one or more processors. The instructions may correspond to a web services component 142 configured to provide one or more assets to client devices 145a, 145b, . . . 145n. For example, web services component 142 can be a web server application configured to provide a website to client devices 145a, 145b, . . . 145n, as can be appreciated by one of ordinary skill in the art. In another example, web services component 142 can be an application service configured to provide a web or cloud-based application to client devices 145a, 145b, . . . 145n, as can also be appreciated by one of ordinary skill in the art.

The computer-readable media of remote server computing device 140 may also include instructions that correspond to an account access component 144 configured to receive, from the one or more client devices 145a, 145b, . . . 145n, an account identifier and a password associated with each login attempt. Moreover, with each incoming login attempt, the account access component 144 can be further configured to provide or deny each of the one or more client devices 145a, 145b, . . . 145n with authorized access to the web services component 142, based on the account credentials associated with their respective login attempts. The account access component 144 can be in communication with the account management device 130 (for instance, through network 120, a local access network, or a VPN) to request authorization regarding whether an account identifier and password associated with each login attempt matches corresponding authentic account credentials stored in memory 170, as will be described with particular respect to account management device 130.

In embodiments described herein, the account access component 144 can be further configured to receive and subsequently store into memory 146, the account credentials (e.g., account identifier and password), login data, or any combination thereof, associated with each incoming login attempt. In other words, each successful and failed attempt (for instance, from client devices 145a, 145b, . . . 145n and/or hacker device 115) to access the web services component 142, including account credentials and login data associated therewith, will be obtained and stored in memory 146 as individual records (e.g., rows in a database or distinguishable entries in a log or text file). In some embodiments, the account access component 144 can be configured to store in the records, instead of the clear-text passwords associated with the login attempts, a variation of the passwords, for purposes of maintaining minimal security standards when storing such information. For instance, a hash of the password, an encrypted version of the password, or a combination thereof, can be kept in a record with the account identifier and/or login data associated with each login attempt. In accordance with generating and storing the records, the account access component 144 can be configured to communicate the records associated with at least the failed login attempts (i.e., the failed attempts to access web services component 142) to account password management component 160 of account management device 130 for analysis, as will now be described.

The account management device 130 can include one or more server computing device(s) configured in a network environment, or can include a single computing device having, in some embodiments, an account password management component 160. The account password management component 160 can be an application or service configured to, in some embodiments, provide system administrators (i.e., system administrators of the one or more remote server devices 140 or of web services component 142 provided therein) with access to a password blacklist generation component 164, as will be described.

Each server computing device of account management device 130 can include one or more processors, and one or more computer-readable media. The computer-readable media may include computer-readable instructions executable by the one or more processors. The instructions may correspond to one or more components, such as an account password management component 160 comprising password policy component 162 or password blacklist generation component 164. The account management device 130 can be configured to store in a memory 170, among other things, computer-readable instructions for providing system administrators with local and/or remote access to the password policy component 162, the password blacklist generation component 164, and/or, in some instances, for obtaining and/or storing records associated with failed login attempts to web services component 142. The memory 170 can be comprised of one or more computer-readable media, or may comprise one or more database(s) (not shown) for storing data, as can be appreciated by one of ordinary skill in the art.

The password policy component 162 can be configured to maintain and enforce, among other things, rules-based restrictions that prevent authorized users of web services component 142 from adopting or readopting passwords that do not meet the requirements defined by the rules-based restrictions. As was described herein above, when authorized users (e.g., of web services component 142) are asked to or are requested to reset their password, various security policies may be employed that prevent them from adopting certain passwords. For instance, time-based rules, history-based rules, and complexity-based rules, are each examples of various security policies that can be defined by system administrators and enforced via the password policy component 162.

The password policy component 162 can also include an analysis component 163 that is configured to analyze a new password for association with one or more authorized users and determine whether the new password is acceptable for adoption thereby. When an authorized user submits a new password (e.g., after a password reset), the password policy component 162 can employ the analysis component 163 to analyze the new password in accordance with the various rules-based restrictions. In this regard, if the new password does not meet the minimum requirements defined by these restrictions, the analysis component 163 can determine that the new password is unacceptable for adoption by the one or more authorized users. The analysis component 163 can also be configured to analyze a new password for association with one or more authorized users in accordance with a password blacklist associated with the one or more authorized users. More specifically, the analysis component 163 can compare the new password with "bad" password entries in the password blacklist associated with the one or more users, and determine that the new password is unacceptable for adoption by the one or more users if the new password matches any one of the "bad" password entries in the password blacklist.

In some embodiments, the analysis component 163 can be configured to compare the new password with "bad" password entries in the password blacklist associated with the one or more users, and determine that the new password is unacceptable for adoption by the one or more users if the new password is substantially similar to any one of the "bad" password entries in the password blacklist. As will be referenced herein, "substantially similar" describes a calculated likeness or similarity between two things that are not identical. Substantially similar can be defined by a calculated percentage of likeness (e.g., at least 90% similar), a minimum number of different password characters (e.g., at least 2 characters are different), or other known comparison methods. By way of example only, assume that an authorized user tries to adopt new password "ObiWanKenobi2," but an analysis of her password history or associated password blacklist (conducted by analysis component 163) reveals a password entry "ObiWanKenobi1." The analysis component 163 can be configured to determine a substantial similarity between the two passwords to prevent the authorized user from adopting the new password because it is substantially similar to a previously-adopted password from the authorized user's password history or associated password blacklist. In some embodiments, when the analysis component 163 determines a substantial similarity between the two passwords, the new password can be added to the authorized user's password blacklist by, for instance, password blacklist generation component 164.

As was described in aspects of password policy component 162, authorized users can be prevented from adopting certain passwords by way of password blacklists. As is generally known in the art, password blacklists can include a list of "bad" passwords that cannot be adopted by authorized users. A password blacklist can be associated with one authorized user, or can be associated with a group of authorized users. In embodiments described herein, the password blacklist generation component 164 can be configured to maintain one or more password blacklists for, among other things, one or more authorized users of web services component 142. An authorized user's password blacklist can be managed and supplemented with new "bad" passwords that cannot or should never be associated with the authorized user's account identifier. A master password blacklist, which can apply to all authorized users, can similarly be managed and supplemented with new "bad" passwords that cannot or should never be associated with any of the authorized users' account identifiers. As such, the password blacklist generation component 164 can be configured to facilitate the maintenance of password blacklists for one or more authorized users of the web services component 142. As will be described in more detail with particular reference to FIG. 2, the password blacklist generation component 164 can include one or more components configured to supplement one or more password blacklists based on security schemas that correspond to how or why a "bad" password entry is added to the one or more password blacklists.

The account management device 130 can comprise a web server, such as Apache®, ITS®, Nginx®, or GWS®, among others, and can be configured to communicate over the network 120 to provide, among other things, a graphical user interface ("GUI") that can be configured to facilitate a system administrator's ability to view and generally manage password blacklists associated with authorized users of the web services component 142. In various embodiments, the system administrators may view the GUI on an administrator client device 110, the account management device 130, and/or the remote server device 140.

While the standard network protocol for communication is HTTP, it is contemplated that any network protocol can be used to distribute information (e.g., the GUI) between the account management device 130 and the browser 112 of administrator client device 110. In various implementations, administrator client device 110 is a computing device that is capable of accessing the Internet, such as the World Wide Web. Administrator client device 110 can include one or more processors, and one or more computer-readable media. The computer-readable media may include computer-readable instructions executable by the one or more processors. The instructions may correspond to one or more applications, such as browser 112 configured to receive and/or provide for display a password blacklist management GUI provided by the account password management component 160 of account management device 130. Administrator client device 110 can be utilized by at least one system administrator of the account management device 130 for managing, among other things, password blacklists for one particular account identifier, a group of account identifiers, or all account identifiers associated with the web services of one or more remote server devices 140.

Browser 112, such as a web browser, can be an HTTP-compatible application (e.g. an application that supports an HTTP or HTTPS protocol). A specific example of browser 112 is the Google® Chrome® web browser. Accessing the account password management component 160 over the web can be accomplished on the administrator client device 110 by visiting a Uniform Resource Identifier (URI or URL) to receive code (e.g., HTML) for rendering, the code being provided by the account management device 130 and communicated to the administrator client device 110 over the network 120.

Looking now to FIG. 2, the password blacklist generation component 200 is configured with various components, as will be described herein, so as to facilitate supplementation of password blacklists. The password blacklist generation component 200 can include, among other things, a compromised entry component 210, a breach detection component 220, a precognition component 230, a labeling component 240, and/or an encryption component 250. On one hand, the labeling component 240 can be configured to associate a label with any "bad" password entry added to one or more password blacklists via the password blacklist generation component 200. The label (e.g., a tag, metadata, or record entry) can reference a security schema describing how or why the "bad" password entry was added to the one or more password blacklists. For example, if a "bad" password entry is added to a password blacklist by way of the precognition component 230, then the labeling component 240 can automatically associate a label referencing "precognition" with the "bad" password entry in the password blacklist. The encryption component 250, on the other hand, can be configured to encrypt any "bad" password entry added, or to be added, to one or more password blacklists. For example, if a "bad" password entry is added to a password blacklist by way of the precognition component 230, then the encryption component 250 can automatically encrypt the password, or the hash thereof, before or after adding it to the password blacklist. As methods of data encryption are generally known in the art, further detail for the operation of encryption component 250 will not be described herein.

As will now be described, the compromised entry component 210, breach detection component 220, and precognition component 230, are each associated with a corresponding security schema. The compromised entry component 210 can be configured to, among other things, provide an interface (e.g., graphical or programmatic) to system administrators for manually supplementing one or more password blacklists. For example, if a system administrator is informed that one or more user passwords was definitely compromised (e.g., via a known-to-be-stolen account identifier/password "list"), the system administrator could simply update the password blacklists of the affected user(s) by adding the known "bad" passwords from the known-to-be-stolen list. In this regard, the labeling component 240 can be configured to automatically associate the manually added "bad" password with a label that references, by way of example only, "compromised password" or "exposed password."

The breach detection component 220 can be configured to, among other things, provide controlled or automated breach detection services that detect ongoing system breaches by way of various breach detection methods, that will not be described herein in detail, to supplement one or more password blacklists. For instance, and by way of example only, a detected large quantity of spam e-mail sent through one or more user accounts can indicate exposed account identifier(s) and password(s). As such, a system administrator via the controlled or automated breach detection service can supplement the password blacklists associated with the affected account identifier(s) as a result of the detected breach. In this regard, the labeling component 240 can be configured to automatically label the "bad" password(s), added by way of breach detection component 220, with a label that references, by way of example only, "detected breach."

The precognition component 230 can be configured to analyze records of failed login attempts (hereinafter referred to as "failed login records") to identify a suspicious pattern of activity in at least some of the records. Based on identifying the suspicious pattern of activity, the precognition component 230 can be further configured to determine that the passwords associated with the records involving the suspicious pattern of activity are "bad" passwords for automated supplementation of associated password blacklists. While descriptions herein provide that supplementation of one or more password blacklists is automated, it is contemplated that the password(s) determined to be "bad" can simply be provided to a system administrator for viewing and/or manual supplementation of the password blacklists.

The precognition component 230 can comprise, among other things, a suspicious pattern identification component 232 configured to analyze failed login records to identify a suspicious pattern of activity associated with at least a set of the failed login records. As was described herein above, the failed login records can be generated and provided by the one or more remote server devices 140 of FIG. 1, or components thereof, so that precognition component 230, among other components of account management device 130 of FIG. 1, can obtain the failed login records for analysis. The failed login records obtained for analysis can be associated with one or more account identifiers, in that the failed login records obtained for analysis are associated with one particular account identifier or a group of account identifiers. As was also described, each of the failed login records can include, among other things, a set of password data and login data that correspond to one of many failed login attempts for which the failed login record was generated. The login data that corresponds to a failed login attempt (hereinafter referred to as the "failed login data") can include a location reference (e.g., an IP address corresponding to the origin of the failed login attempt) and/or a temporal reference (e.g., a timestamp corresponding to a time that the failed login attempt was received or detected).

The suspicious pattern identification component 232 can be configured to analyze all of the obtained failed login records to identify a suspicious pattern of activity associated with at least a portion of the failed login records. An initial analysis of the obtained failed login records can include examining all sets of password data, all failed login data, or a combination thereof, from the failed login records, to identify a set of failed login records (i.e., at least a portion of the obtained failed login records) that could potentially reveal a suspicious pattern of activity characterized by the failed login data included therein. The set of failed login records identified by way of this initial analysis is referred to herein as the "identified set."

The identified set can be determined using at least two general methodologies. In one way, the identified set can be determined by identifying which of the failed login records obtained for analysis include identical sets of password data (hereinafter referred to as "a common set" of password data). That is, a particular group of the obtained failed login records may reveal that all of the corresponding failed login attempts utilized the same account identifier/password combination. In another way, the identified set can be determined by identifying which of the failed login records obtained for analysis include identical portions of failed login data (e.g., location references). That is, a particular group of the obtained failed login records may reveal that all of the corresponding failed login attempts originated from a single location or network address. After the identified set is determined, the suspicious pattern identification component 232 can be configured to conduct an analysis on the failed login records from the identified set to determine whether geographic and/or temporal characteristics of the failed login attempts reveal a suspicious pattern of activity. In some embodiments, if the analysis does not reveal a suspicious pattern of activity, no further action need be taken. While the description provided herein is directed to the identification of a single set of failed login records, it is contemplated that more than one set of failed login records can be identified. In an event that more than one set is identified, an analysis can be conducted on each identified set to determine whether it reveals a suspicious pattern of activity characterized by the failed login data included therein.

In an embodiment where an identified set is determined based on a group of failed login records having a common set of password data, the suspicious pattern identification component 232 may determine that every failed login record in the identified set also includes the same account identifier. In other words, each failed login record from the identified set can reveal that the same account identifier and password combination was used in numerous failed attempts to access the system (e.g., remote computing device 140). When the suspicious pattern identification component 232 determines that the same account identifier and password combination was used in these failed attempts, the suspicious pattern identification component 232 can then analyze the failed login data (e.g., location references and/or temporal references) from the identified set to determine an unlikelihood that each of the failed login records correspond to legitimate login attempts made by the true owner of the account identifier, as will now be described.

The factors considered in determining an unlikelihood that the failed login records correspond to legitimate login attempts made by the true owner of the account identifier can include a calculated distance approximation between two or more location references and/or a calculated amount of time passed between the two or more corresponding temporal references. The suspicious pattern identification component 232 can be configured to determine these factors and compare them to a realistic travel time threshold. The realistic travel time threshold can be provided to the suspicious pattern identification component 232 by a system administrator, or in some embodiments, calculated by the suspicious pattern identification component 232 by determining average travel times between the two or more location references. Travel times can be determined using publicly available information (e.g., airline schedules, train schedules, bus schedules, travel time calculators, etc.) provided to or obtained by the suspicious pattern identification component 232. For instance, the location references and temporal references from the identified set can reveal that the failed login attempts were made in geographically-distant locations (e.g., in different countries or regions), and made within a timeframe (e.g., one week) that make it unlikely or even impossible that the true owner of the account identifier was solely responsible for making the attempts to access the system at these times and from these locations, based on a realistic travel time threshold.

In an event that the failed login attempts are determined as being unlikely made by the true owner, the suspicious pattern identification component 232 can extract the common set of password data from the identified set for supplementation as a "bad" password to the password blacklist associated with the account identifier. In one embodiment, the common set of password data can then be added to the password blacklist associated with the account identifier by, for instance, a system administrator. In another embodiment, the common set of password data can automatically be added to the password blacklist associated with the account identifier by the suspicious pattern identification component 232.

In an embodiment where the identified set is determined based on a group of failed login records having a common set of password data, the suspicious pattern identification component 232 may determine that the failed login records in the identified set do not include the same account identifier. In other words, the failed login records from the identified set can reveal that different account identifiers were used in combination with the same password in numerous attempts to access the system. This determination will only occur if and when the obtained failed login records are associated with more than one account identifier. For instance, if an initial analysis is initialized by the precognition component 230, to determine whether the entire collection of failed login records generated by the system (e.g., remote computing device 140) could reveal a suspicious pattern of activity, then the initial analysis could determine that the same password was combined with a variety of account identifiers corresponding to a number of failed login attempts. When the suspicious pattern identification component 232 determines that identified set includes different account identifiers paired with a common set of password data, the suspicious pattern identification component 232 can then analyze the location references and/or temporal references from the identified set to determine a likelihood that the failed login attempts correspond to a brute force attempt to access the system using a common or probable password in combination with known account identifiers, as will now be described.

The factors considered in determining a likelihood of a brute force attempt using a commonly-adopted password can include a calculated average amount of time passed between the temporal references from the identified set, a determined number of failed login records having temporal references that fall within a predefined "short" duration of time, and/or a determination that all of the failed login records from the identified set include an identical or "common" location reference. The suspicious pattern identification component 232 can be configured to calculate or determine these factors and compare them to predefined thresholds to determine a likelihood of a brute force attempt using a commonly-adopted password.

The calculated average amount of time passed between the temporal references can be compared to a rapid succession threshold that is predefined, programmatically or by a system administrator. By way of a non-limiting example only, the suspicious pattern identification component 232 could determine that the temporal references in the identified set reveals failed login attempts made in rapid succession (e.g., one immediately after another) averaging about 10 ms between each attempt, while the location references therein further reveal that the failed login attempts originated from the same network address. If the rapid succession threshold is predefined as 15 ms, then the suspicious pattern identification component 232 can determine that it is highly likely that a bot (e.g., an automated script) or malicious program was making attempts to access the system using known account identifiers in combination with a commonly-adopted password.

Similarly, the suspicious pattern identification component 232 can be configured to determine a number of failed login records that have temporal references falling within a "short" duration threshold that is predefined programmatically or by a system administrator. By way of a non-limiting example only, the suspicious pattern identification component 232 could determine that the temporal references in the identified set reveals thirty failed login attempts occurring between 12:00 PM and 12:01 PM on Jan. 1, 2016. If the "short" duration threshold is predefined as two minutes, and a predefined maximum number of failed login records within this "short" duration threshold of two minutes is three, then the suspicious pattern identification component 232 can determine that it is highly likely that a bot (e.g., an automated script) or malicious program was making attempts to access the system using known account identifiers in combination with a commonly-adopted password.

In an event that the suspicious pattern identification component 232 determines that it is highly likely that a brute force attempt using a commonly-adopted password was made on the system, the suspicious pattern identification component 232 can extract the common set of password data from the identified set for supplementation to password blacklists associated with the account identifiers in the identified set. In some embodiments, the commons set of password data can be extracted for supplementation to a master password blacklist that is associated with all account identifiers. In one embodiment, the common set of password data can then be added to a password blacklist associated with each account identifier in the identified set by, for instance, a system administrator. In another embodiment, the common set of password data can automatically be added to a password blacklist associated with each account identifier in the identified set by the suspicious pattern identification component 232.

In an embodiment where an identified set is determined based on a group of failed login records having identical portions of failed login data (e.g., location reference), the suspicious pattern identification component 232 may determine that every failed login record in the identified set originated from the same network address. In other words, each failed login record from the identified set can reveal that one particular network address was associated with numerous failed attempts to access the system (e.g., remote computing device 140). When the suspicious pattern identification component 232 determines that these failed attempts originated from one network address, the suspicious pattern identification component 232 can then analyze the temporal references from the identified set to determine an unlikelihood that each of the failed login records correspond to legitimate login attempts originating from the same location and made by the true owners of the account identifiers.

The factors considered in determining an unlikelihood that the failed login records correspond to legitimate login attempts originating from the same location and made by the true owners of the account identifiers can include a calculated average amount of time passed between the temporal references from the identified set, and/or a determined number of failed login records having temporal references that fall within a predefined "short" duration of time. The suspicious pattern identification component 232 can be configured to calculate or determine these factors and compare them to predefined thresholds to determine the unlikelihood that the failed login records correspond to legitimate login attempts originating from the same location and made by the true owners of the account identifiers.

The calculated average amount of time passed between the temporal references can be compared to a rapid succession threshold that is predefined, programmatically or by a system administrator. By way of a non-limiting example only, the suspicious pattern identification component 232 could determine that the temporal references in the identified set reveals failed login attempts made in rapid succession (e.g., one immediately after another) averaging about 10 ms between each attempt, while the location references therein further reveal that the failed login attempts originated from the same network address. If the rapid succession threshold is predefined as 15 ms, then the suspicious pattern identification component 232 can determine that it is unlikely that the failed login records correspond to legitimate login attempts originating from the same location and made by the true owners of the account identifiers. That is, it would be nearly impossible for numerous users to login from the same location within such rapid succession. Instead, the suspicious pattern identification component 232 may determine that it is highly likely that a bot, a malicious program, or perhaps an individual, was making attempts to access the system using a "list" of known account identifiers in combination with assumed-to-be known passwords.

Similarly, the suspicious pattern identification component 232 can be configured to determine a number of failed login records that have temporal references falling within a "short" duration threshold that is predefined programmatically or by a system administrator. By way of a non-limiting example only, the suspicious pattern identification component 232 could determine that the temporal references in the identified set reveals thirty failed login attempts from the same location and occurring between 12:00 PM and 12:01 PM on Jan. 1, 2016. If the "short" duration threshold is predefined as two minutes, and a predefined maximum number of failed login records occurring within the "short" duration threshold is three, then the suspicious pattern identification component 232 can determine that it is highly unlikely that the failed login records correspond to legitimate login attempts originating from the same location and made by the true owners of the account identifiers. That is, it would be nearly impossible for numerous users to login from the same location within such a short period of time. Instead, the suspicious pattern identification component 232 may determine that it is highly likely that a bot, a malicious program, or perhaps an individual, was making attempts to access the system using a "list" of known account identifiers in combination with assumed-to-be known passwords.

In an event that the suspicious pattern identification component 232 determines that it is highly unlikely that the failed login records correspond to legitimate login attempts originating from the same location and made by the true owners of the corresponding account identifiers, the suspicious pattern identification component 232 can extract the set of password data from each failed login record in the identified set for supplementation to the password blacklist associated with the corresponding account identifier. In one embodiment, the sets of password data can then be added to the appropriate password blacklists associated with the account identifiers in the identified set by, for instance, a system administrator. In another embodiment, the sets of password data can automatically be added to the appropriate password blacklists associated with the account identifiers in the identified set by the suspicious pattern identification component 232.

Having described various aspects of the present disclosure, exemplary methods are described below for improving account security based on identified suspicious patterns of activity. Referring to FIG. 3 in light of FIGS. 1-2, FIG. 3 is a flow diagram showing a method 300 for improving account security based on identified suspicious patterns of activity. Each block of method 300 and other methods described herein comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few.

At block 310, a plurality of failed login records are obtained for analysis. Each of the failed login records have a set of password data and failed login data that are associated with one or more failed login attempts to a system such as remote server device 140 of FIG. 1. The set of password data can be a hash of the password that was used in the corresponding failed login attempt. The failed login data can include a location reference (e.g., a network address or IP address) and/or a temporal reference (e.g., a timestamp). While embodiments described herein generally assume that all of the failed login attempts were made by a malicious user, such as hacker 115 in FIG. 1, it is contemplated that many of the failed login attempts were also made by authorized users of the system, such as asset users on client devices 145a, 145b, . . . 145n.

At block 320, a set of failed login records is identified for further analysis by determining which of the failed login records obtained in block 310 include a common set of password data. In essence, the identified set corresponds to a group of failed login attempts that all utilized the same password. For instance, if one-hundred failed login records reveal that the password "Password1" was used in ten different failed login attempts (i.e., the password was included in ten of the one-hundred failed login records), then the set of failed login records ("the identified set") will include the ten failed login records including "Password1." If the set of password data is a hash of the password used in the failed login attempts, then each of the ten failed login records may have identical hashes of "Password1" included therein.

At block 330, a determination is made whether the same account identifier is included in every failed login record in the identified set. In other words, was the same account identifier and password combination used in the every failed login attempt in the group of failed login attempts? If the same account identifier is included in every failed login record in the identified set, then at block 340, the failed login data (e.g., location references and/or temporal references) is analyzed to determine whether the records collectively reveal a suspicious pattern of activity. At block 350, a determination, based on the analysis of the failed login data, is made on the likelihood that the failed login records correspond to legitimate login attempts made by the true owner of the account identifier. If it is determined unlikely that the failed login records correspond to legitimate login attempts made by the true owner of the account identifier, then at block 360, the common set of password data is added to a password blacklist associated with the account identifier.

In some embodiments, if a suspicious pattern of activity was detected in an identified set (e.g., it is determined unlikely that the failed login records correspond to legitimate login attempts made by the true owner of the account identifier), such a determination alone can be provided to a system administrator as an indication that the account identifier is susceptible to breach, or that the account identifier should be of particular interest to the system administrator. In some instances, the determination can be associated with the account identifier, as a "red flag" of sorts, such that any service operator (e.g., via call centers, help messaging, on-line flows associated with the system) communicating to the owner of the account identifier, can be aware of the security concerns associated with the account identifier.

If different account identifiers are included in the failed login records of the identified set, then at block 370, the failed login data (e.g., location references and/or temporal references) is analyzed to determine whether the records collectively reveal a suspicious pattern of activity. At block 380, a determination, based on the analysis of the failed login data, is made on the likelihood that a brute force attempt to access the system was made using a popular or probable password in combination with account identifiers known to be associated with the system. If it is determined likely that the failed login records correspond to a brute force attempt, then at block 390, the common set of password data is added to a password blacklist associated with all of the account identifiers in the identified set, or with a universal password blacklist associated with all account identifiers in the system.

Figure 2:
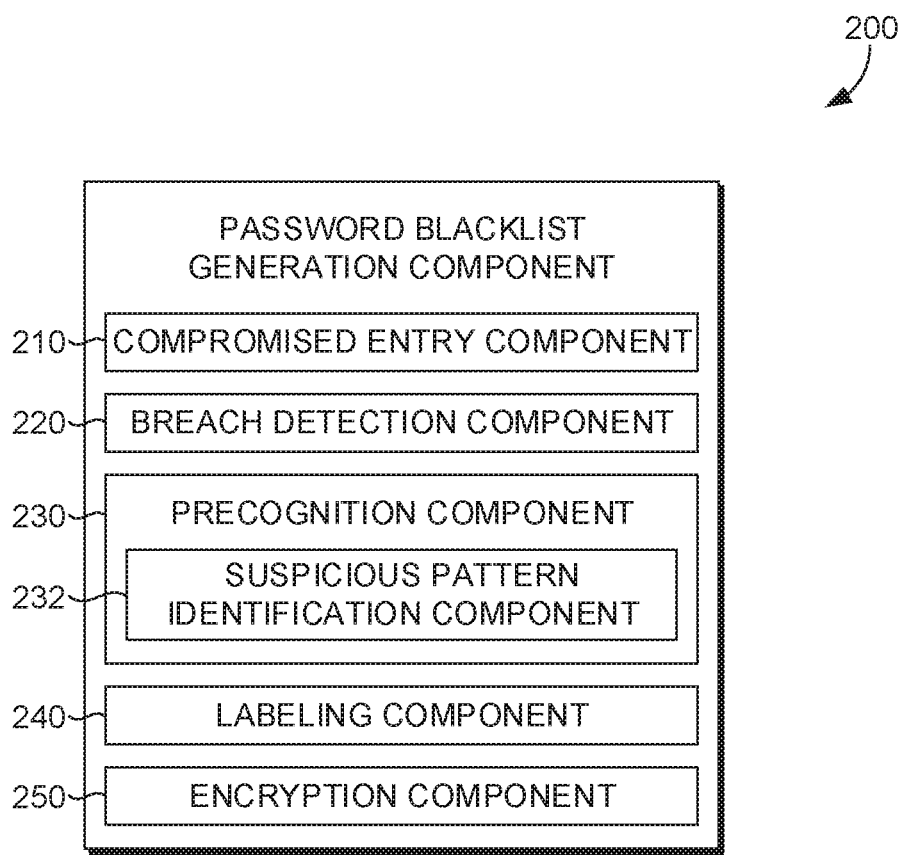
FIG. 2 is a diagram illustrating an exemplary password blacklist generation component, in accordance with some implementations of the present disclosure.
Figure 3:
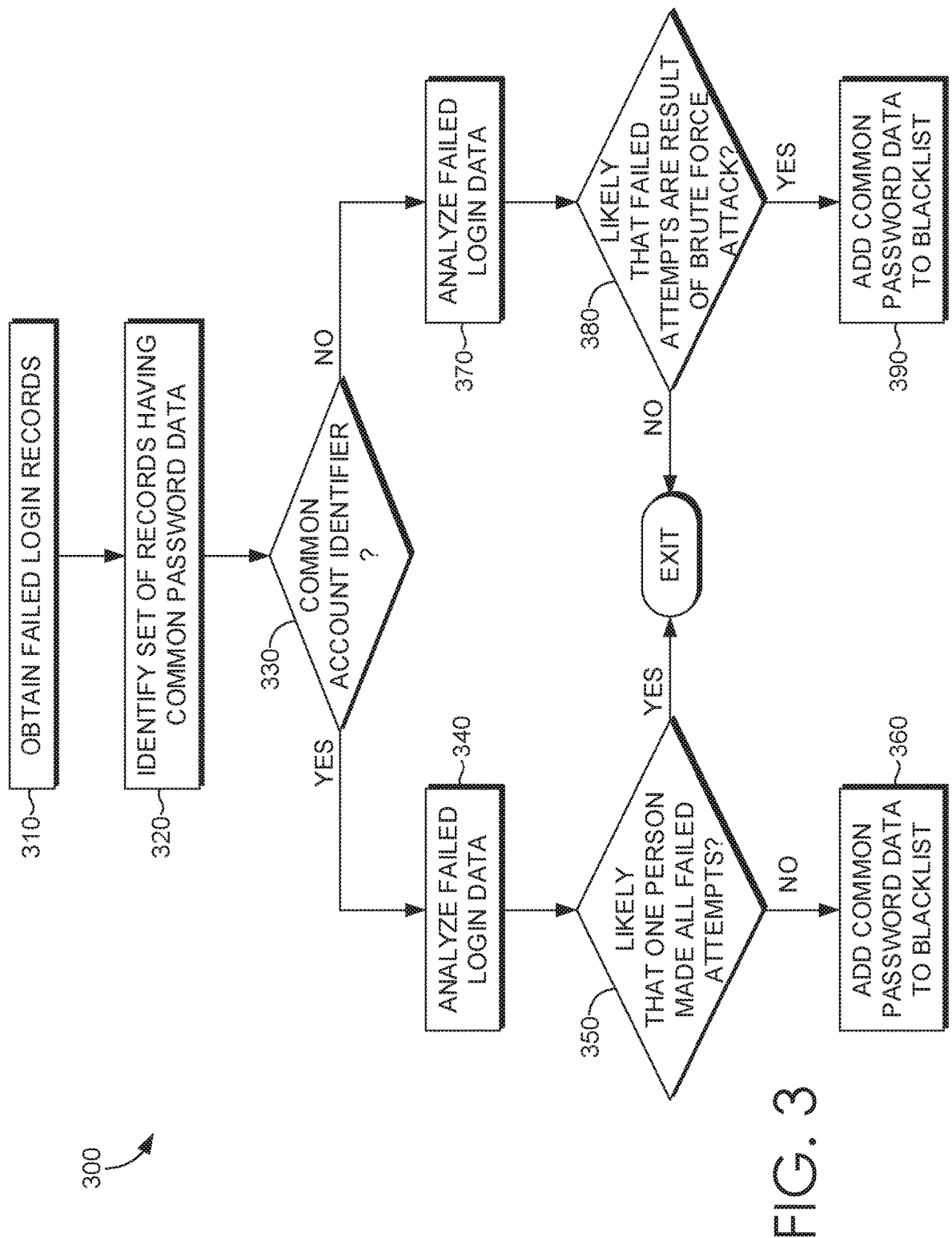
FIG. 3 is a flow diagram showing a method for improving account security based on identified suspicious patterns of activity, in accordance with some implementations of the present disclosure.
Figure 4:
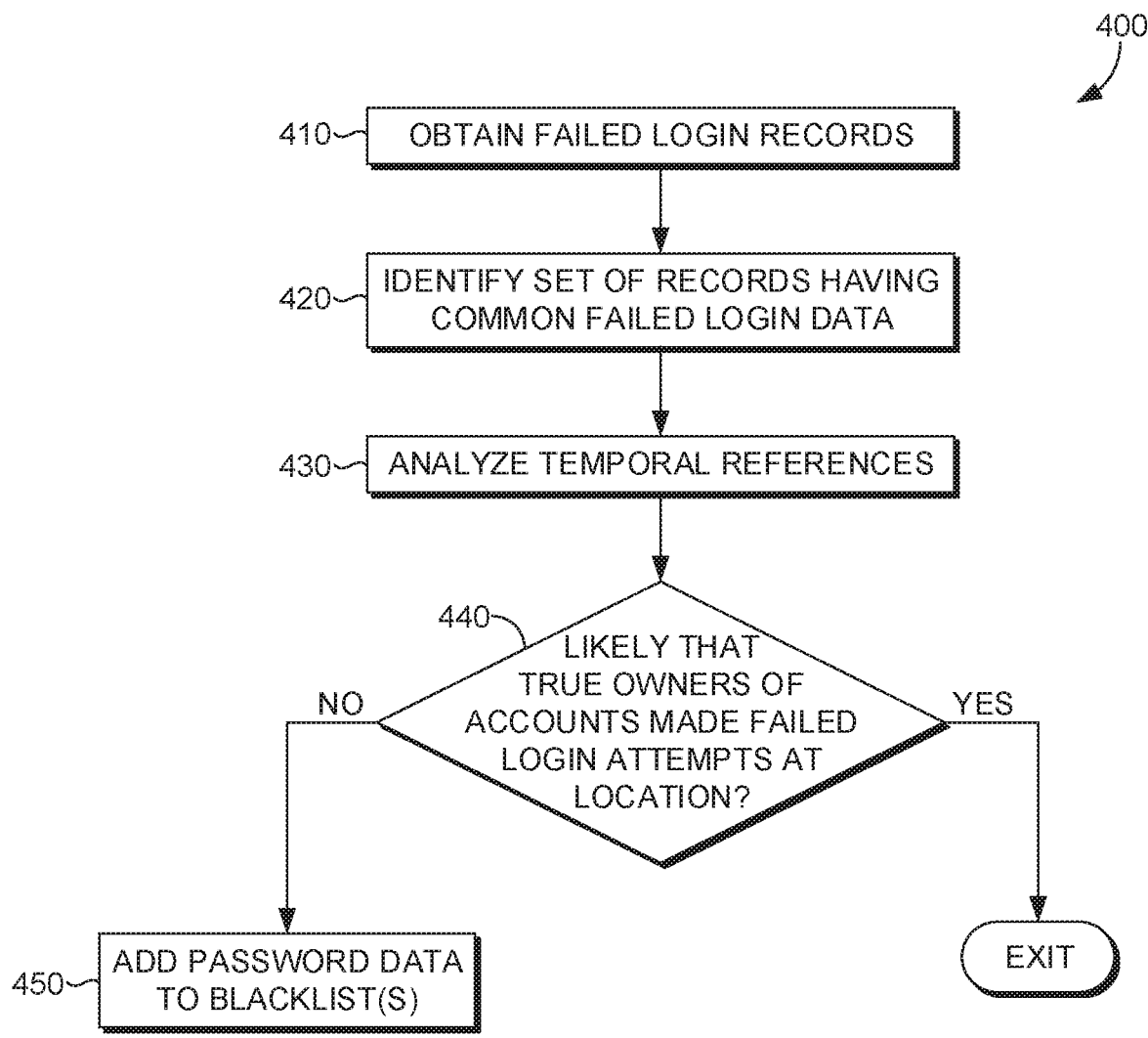
FIG. 4 is flow diagram showing another method for improving account security based on identified suspicious patterns of activity, in accordance with some implementations of the present disclosure.

Referring now to FIG. 4 in light of FIGS. 1-2, FIG. 4 is a flow diagram showing a method 400 for improving account security based on identified suspicious patterns of activity. Each block of method 400 and other methods described herein comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few.

At block 410, a plurality of failed login records are obtained for analysis. Each of the failed login records have a set of password data and failed login data that are associated with one or more failed login attempts to a system such as remote server device 140 of FIG. 1. The set of password data can be a hash of the password that was used in the corresponding failed login attempt. The failed login data can include a location reference (e.g., a network address or IP address) and/or a temporal reference (e.g., a timestamp).

At block 420, a set of failed login records is identified for further analysis by determining which of the failed login records obtained in block 410 include common portions of failed login data. In essence, the identified set corresponds to a group of failed login attempts that originated at the same location, in accordance with the recorded network address. For instance, if one-hundred failed login records reveal that ten different failed login attempts originated from IP address "23.213.212.165" (i.e., the IP address was included in ten of the one-hundred failed login records), then the set of failed login records ("the identified set") will include the ten failed login records including location reference "23.213.212.165."

At block 430, the temporal references from the identified set are analyzed to determine whether the records collectively reveal a suspicious pattern of activity. More specifically, the analysis determines a likelihood that the failed login records correspond to legitimate login attempts from the same location and made by the true owners of the account identifiers. At block 440, a determination, based on the analysis of the failed login data (e.g., the temporal references), is made on the likelihood that the failed login records correspond to legitimate login attempts, originating from the same location, and made by the true owners of the account identifiers associated with the identified set. If it is determined unlikely that the failed login records correspond to legitimate login attempts made at the same location and by the true owners of the account identifiers, then at block 450, the sets of password data from the identified set are added to the password blacklists associated with their corresponding account identifier.

It is contemplated that the methods 300, 400 for improving account security based on identified suspicious patterns of activity can be combined into a single method. For instance, a set of failed login records can be identified based on either a common set of password data or a common portion of failed login data being present in a group of the failed login records obtained for analysis. Depending on how the identified set is determined, the analysis can continue using method 300 or method 400. For example, if the identified set is determined in accordance with all of the failed login records of the identified set having a common set of password data, then method 300 for identifying the suspicious pattern of activity and supplementing password blacklist(s) is employed. If, on the other hand, the identified set is determined in accordance with all of the failed login records of the identified set having a common portion of failed login data, then method 400 for identifying the suspicious pattern of activity and supplementing password blacklist(s) is employed.

Figure 5:
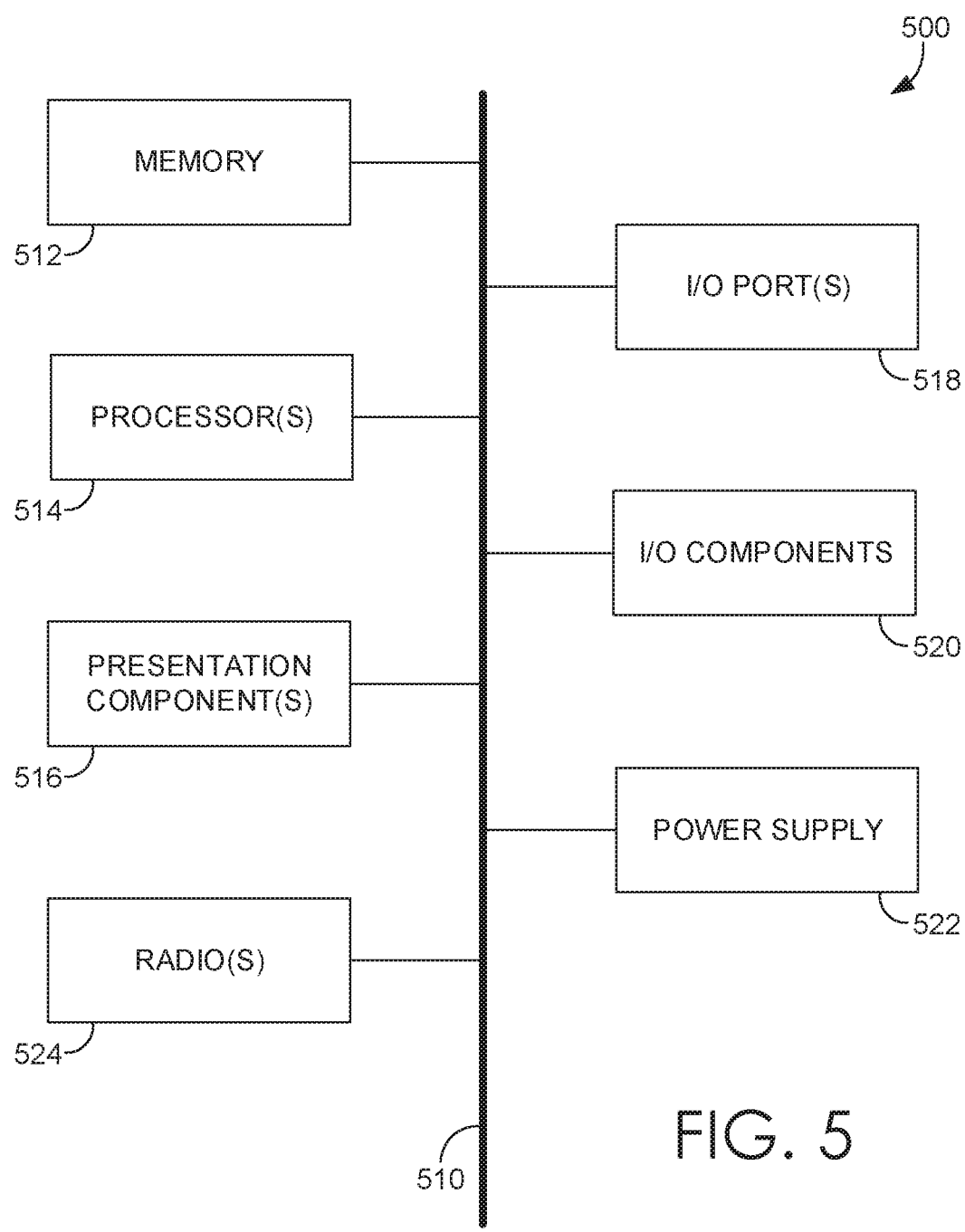
FIG. 5 is a block diagram of an exemplary computing environment suitable for use in implementations of the present disclosure.

With reference to FIG. 5, computing device 500 includes bus 510 that directly or indirectly couples the following devices: memory 512, one or more processors 514, one or more presentation components 516, input/output (I/O) ports 518, input/output components 520, and illustrative power supply 522. Bus 510 represents what may be one or more busses (such as an address bus, data bus, or combination thereof). Although the various blocks of FIG. 5 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 5 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 5 and reference to "computing device."

Computing device 500 typically includes a variety of computer-readable media. Computer-readable media can be any available media that can be accessed by computing device 500 and includes both volatile and nonvolatile media, removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 500. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 512 includes computer-storage media in the form of volatile and/or nonvolatile memory. The memory may be removable, non-removable, or a combination thereof. Exemplary hardware devices include solid-state memory, hard drives, optical-disc drives, etc. Computing device 500 includes one or more processors that read data from various entities such as memory 512 or I/O components 520. Presentation component(s) 516 present data indications to a user or other device. Exemplary presentation components include a display device, speaker, printing component, vibrating component, etc.

I/O ports 518 allow computing device 500 to be logically coupled to other devices including I/O components 520, some of which may be built in. Illustrative components include a microphone, joystick, game pad, satellite dish, scanner, printer, wireless device, etc. The I/O components 520 may provide a natural user interface (NUI) that processes air gestures, voice, or other physiological inputs generated by a user. In some instance, inputs may be transmitted to an appropriate network element for further processing. A NUI may implement any combination of speech recognition, touch and stylus recognition, facial recognition, biometric recognition, gesture recognition both on screen and adjacent to the screen, air gestures, head and eye tracking, and touch recognition associated with displays on the computing device 500. The computing device 500 may be equipped with depth cameras, such as, stereoscopic camera systems, infrared camera systems, RGB camera systems, and combinations of these for gesture detection and recognition. Additionally, the computing device 500 may be equipped with accelerometers or gyroscopes that enable detection of motion. The output of the accelerometers or gyroscopes may be provided to the display of the computing device 500 to render immersive augmented reality or virtual reality.

As described above, implementations of the present disclosure provide for improving account security based on identified suspicious patterns of activity. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. A computer-implemented method, comprising:
    obtaining a list that includes a record generated for each of a plurality of detected failed login attempts, each record including a corresponding account identifier, a corresponding piece of password data, a corresponding location reference, and a corresponding temporal reference associated with one of the plurality of detected failed login attempts;
    determining that:
        a first location reference in the list and a second location reference in the list are indicative of a same location,
        a first account identifier in the list associated with the first location reference is different than a second account identifier in the list associated with the second location reference, and
        a number of generated records in the list that are indicative of the same location exceeds a predefined threshold of failed login attempts for a predefined duration based on one or more temporal references in the list;
    in response to the determination, modifying a password blacklist to include a first piece of password data identified as being associated with a plurality of failed login attempts that (i) used a plurality of account identifiers comprising the first account identifier and the second account identifier and (ii) were associated with the same location indicated by the first location reference in the list and the second location reference in the list, wherein the first piece of password data was stored in the number of generated records in the list, wherein the password blacklist is associated with a set of account identifiers;
    supplementing a master password blacklist, associated with two or more account identifiers not in the set of account identifiers, with the first piece of password data, wherein the master password blacklist is different than the password blacklist; and
    upon receiving a new password submitted by a user for adoption in association with an account identifier associated with the password blacklist, employing the password blacklist to prevent adoption of the new password when the new password matches the first piece of password data in the password blacklist.

2. The computer-implemented method of claim 1, wherein the password blacklist includes a first label indicative of a first security schema associated with adding the first piece of password data to the password blacklist.

3. The computer-implemented method of claim 2, wherein the password blacklist includes a second label indicative of a second security schema associated with adding a second piece of password data to the password blacklist.

4. The computer-implemented method of claim 1, comprising:
    determining a defined suspicious pattern of activity type; and
    modifying the password blacklist to include a reference to the defined suspicious pattern of activity type.

5. The computer-implemented method of claim 1, wherein each corresponding location reference in the list includes a network address associated with one of the plurality of detected failed login attempts.

6. The computer-implemented method of claim 1, wherein each corresponding temporal reference in the list includes a timestamp associated with one of the plurality of detected failed login attempts.

7. The computer-implemented method of claim 1, wherein each corresponding piece of password data in the list includes a password hash associated with one of the plurality of detected failed login attempts.

8. A system comprising:
    a hardware processor; and
    memory storing instructions that, when executed by the hardware processor, cause the hardware processor to:

obtain a list that includes a record generated for each of a plurality of detected failed login attempts, each record including a corresponding account identifier, a corresponding piece of password data, a corresponding location reference, and a corresponding temporal reference associated with one of the plurality of detected failed login attempts;

determine that:
a first location reference in the list and a second location reference in the list are indicative of different locations,
a first account identifier in the list associated with the first location reference is a same account identifier as a second account identifier in the list associated with the second location reference, and
a number of generated records in the list that are indicative of two or more different locations in association with the same account identifier exceeds a predefined threshold of failed login attempts for a predefined duration based on one or more temporal references in the list;

in response to the determination, modify a password blacklist to include a first piece of password data identified as being associated with a plurality of failed login attempts that (i) were associated with a plurality of location references comprising the first location reference and the second location reference and (ii) were associated with the same account identifier indicated by the first account identifier in the list and the second account identifier in the list, wherein the password blacklist is associated with a set of account identifiers;

supplement a master password blacklist, associated with two or more account identifiers not in the set of account identifiers, with the first piece of password data, wherein the master password blacklist is different than the password blacklist; and upon receiving a new password submitted by a user for adoption in association with an account identifier associated with the password blacklist, employ the password blacklist to prevent an adoption of the new password when the new password matches the first piece of password data in the password blacklist matches the first piece of password data in the password blacklist.

9. The system of claim 8, the instructions, when executed by the hardware processor, causing the hardware processor to determine that the first location reference is associated with a first country and the second location reference is associated with a second country different than the first country.

10. The system of claim 8, the instructions, when executed by the hardware processor, causing the hardware processor to determine that two or more account identifiers in the list are identical.

11. The system of claim 8, the instructions, when executed by the hardware processor, causing the hardware processor to:
determine a defined suspicious pattern of activity type; and
modify the password blacklist to include a reference to the defined suspicious pattern of activity type.

12. The system of claim 8, wherein each corresponding location reference in the list includes a network address associated with one of the plurality of detected failed login attempts.

13. The system of claim 8, wherein each corresponding piece of password data in the list includes a password hash associated with one of the plurality of detected failed login attempts.

14. A non-transitory computer-readable medium storing instructions that, when executed, cause performance of operations comprising:
obtaining a list that includes a record generated for each of a plurality of detected failed login attempts, each record including a corresponding account identifier, a corresponding piece of password data, and a corresponding temporal reference associated with one of the plurality of detected failed login attempts;
determining that:
a first account identifier in the list is identical to a second account identifier in the list,
a first piece of password data in the list is different than a second piece of password data in the list, and
a number of generated records in the list exceeds a predefined threshold of failed login attempts for a predefined duration based on one or more temporal references in the list;
in response to the determination, modifying a password blacklist to include the first piece of password data identified as being associated with a plurality of failed login attempts that (i) used a plurality of pieces of password data comprising the first piece of password data and the second piece of password data and (ii) were associated with a same account identifier indicated by the first account identifier in the list and the second account identifier in the list, wherein the first piece of password data was stored in the number of generated records in the list, wherein the password blacklist is associated with a set of account identifiers;
supplementing a master password blacklist, associated with two or more account identifiers not in the set of account identifiers, with the first piece of password data, wherein the master password blacklist is different than the password blacklist; and
upon receiving a new password submitted by a user for adoption in association with an account identifier associated with the password blacklist, employing the password blacklist to prevent adoption of the new password when the new password matches the first piece of password data in the password blacklist.

15. The non-transitory computer-readable medium of claim 14, the operations comprising determining that a first location reference is associated with a first country and a second location reference is associated with a second country different than the first country.

16. The non-transitory computer-readable medium of claim 14, the operations comprising determining that two or more account identifiers in the list are identical.

17. The non-transitory computer-readable medium of claim 14, the operations comprising:
determining a defined suspicious pattern of activity type; and
modifying the password blacklist to include a reference to the defined suspicious pattern of activity type.

18. The non-transitory computer-readable medium of claim 14, wherein each corresponding location reference in the list includes a network address associated with one of the plurality of detected failed login attempts.

19. The non-transitory computer-readable medium of claim 14, wherein each corresponding temporal reference in the list includes a timestamp associated with one of the plurality of detected failed login attempts.

20. The non-transitory computer-readable medium of claim 14, wherein each corresponding piece of password data in the list includes a password hash associated with one of the plurality of detected failed login attempts.

\* \* \* \* \*